US008890651B2

(12) United States Patent
Jin et al.

(10) Patent No.: US 8,890,651 B2
(45) Date of Patent: Nov. 18, 2014

(54) INTERCHANGEABLE LOCK CORE AND OPENING METHOD THEREOF

(75) Inventors: Shuqiang Jin, Zhuhai (CN); Qing Chang, Zhuhai (CN); Hongwei Qiao, Zhuhai (CN); Lei Ji, Zhuhai (CN); Shuiping Liao, Zhuhai (CN)

(73) Assignee: Youtech, Inc., Mountain View, CA (US)

( * ) Notice: Subject to any disclaimer, the term of this patent is extended or adjusted under 35 U.S.C. 154(b) by 68 days.

(21) Appl. No.: 13/475,451

(22) Filed: May 18, 2012

(65) Prior Publication Data

US 2013/0024038 A1 Jan. 24, 2013

Related U.S. Application Data

(60) Provisional application No. 61/509,917, filed on Jul. 20, 2011.

(51) Int. Cl.

| | |
|---|---|
| ***G06F 1/26*** | (2006.01) |
| ***E05B 9/08*** | (2006.01) |
| ***E05B 27/08*** | (2006.01) |
| ***E05B 67/24*** | (2006.01) |
| ***E05B 35/00*** | (2006.01) |
| *G07C 9/00* | (2006.01) |

(52) U.S. Cl.

CPC ............... *E05B 27/086* (2013.01); *E05B 9/084* (2013.01); *G07C 2009/00769* (2013.01); *G07C 9/00857* (2013.01); *E05B 67/24* (2013.01); *E05B 35/001* (2013.01); *G07C 9/00309* (2013.01)

USPC ............................ 340/5.61; 340/5.64; 70/263

(58) Field of Classification Search

CPC . E05B 19/00; E05B 19/0005; E05B 19/0017; E05B 19/0023; E05B 19/0029; E05B 19/0094

USPC .................... 340/5.6, 5.61, 5.62, 5.063, 5.64; 70/278.3, 395, 408, 348

See application file for complete search history.

(56) References Cited

U.S. PATENT DOCUMENTS

| | | | | |
|---|---|---|---|---|
| 2003/0205070 | A1 * | 11/2003 | Chaum | 70/278.3 |
| 2004/0027236 | A1 * | 2/2004 | Zhai | 340/5.6 |
| 2004/0159135 | A1 * | 8/2004 | Kato et al. | 70/278.3 |
| 2004/0160305 | A1 * | 8/2004 | Remenih et al. | 340/5.22 |
| 2006/0072755 | A1 * | 4/2006 | Oskari | 380/270 |

* cited by examiner

*Primary Examiner* — Nabil Syed

(74) *Attorney, Agent, or Firm* — Shun Yao; Park, Vaughan, Fleming & Dowler LLP

(57) ABSTRACT

One embodiment of the present invention provides a lock-and-key system for an electrical power plant. The system includes a plurality of locks and a smart key. A respective lock is installed with a standardized lock core, and the lock is associated with a lock identifier (ID). The smart key includes a key head that matches the standardized lock core; a lock-ID detector configured to detect the lock ID; a rotation stopper which, when enabled, is configured to prevent rotation of the key head while the key head is inserted into the standardized lock core; and a control module configured to disable the rotation stopper based on the detected lock ID, thereby facilitating the smart key to unlock the lock by rotating the key head.

25 Claims, 8 Drawing Sheets
(4 of 8 Drawing Sheet(s) Filed in Color)

300 300

100

INTERCHANGEABLE LOCK CORE AND OPENING METHOD THEREOF

RELATED APPLICATION

This application claims the benefit of U.S. Provisional Application No. 61/509,917, entitled "Interchangeable Lock Core and Opening Method Thereof," by inventors Shugiang Jin, Qing Chang, Hongwei Qiao, Lei Ji, and Shuiping Liao, filed 20 Jul. 2011.

BACKGROUND

1. Field

The present disclosure relates generally to locks and keys used in an electric power system. More specifically, the present disclosure relates to a novel interchangeable lock core that enables the opening of various locks using a single smart key.

2. Related Art

Modern electric power plants or transmission substations often involve many different types of locks. Some locks are used to control access, such as locks used on gates or cabinet doors, and some locked are used for interlocking, such as locks used on knife switches or ground wires. These many locks require the management of many corresponding keys, which is tedious and prone to human error.

In a substation, a conventional approach for key management involves a centralized key cabinet, which stores the various types of physical mechanical keys for the various locks. Before a field staff member can perform a switching operation, he needs to access the key cabinet and retrieve the appropriate mechanical keys. Because of the large number of the keys in the key cabinet (such as tens or even hundreds), manual retrieval of keys may result in errors. For example, the field staff member may miss a key or retrieve the wrong key, thus causing delays in the switching operation. Statistics show that the key retrieval accounts for nearly 10% of the total time necessary for the completion of the switching operation.

SUMMARY

One embodiment of the present invention provides a lock-and-key system for an electrical power plant. The system includes a plurality of locks and a smart key. A respective lock is installed with a standardized lock core, and the lock is associated with a lock identifier (ID). The smart key includes a key head that matches the standardized lock core; a lock-ID detector configured to detect the lock ID; a rotation stopper which, when enabled, is configured to prevent rotation of the key head while the key head is inserted into the standardized lock core; and a control module configured to disable the rotation stopper based on the detected lock ID, thereby facilitating the smart key to unlock the lock by rotating the key head.

In a variation on this embodiment, the system further includes a smart key management module configured to determine whether the smart key is allowed to unlock the lock based on a user of the smart key and/or the lock ID.

In a further variation, the smart key further comprises a transceiver module configured to communicate with the smart key management module.

In a further variation, the smart key management module is further configured to maintain an operation record of the smart key.

In a further variation, while determining whether the smart key is allowed to unlock the lock, the smart key management module is further configured to perform a switching-error-prevention simulation.

In a variation on this embodiment, the lock further includes a radio-frequency identification (RFID) tag configured to store the lock ID, and the lock-ID detector is an RFID reader.

In a variation on this embodiment, the standardized lock core is a tubular lock.

In a variation on this embodiment, the rotation stopper is a spring-loaded sliding pin.

In a further variation, while disabling the rotation stopper, the control module is configured to retract a plug to enable the spring-loaded sliding pin to slide horizontally.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a lock-and-key system that enables the use of a single key for opening different types of locks. The system includes various types of locks and a smart key. The various types of locks are all installed with a standardized, interchangeable lock core. The standardized lock core has a uniform pin profile that matches the key profile of the mechanical component of the smart key. In addition, each lock core is associated with a unique identifier that can be read by the electrical component of the smart key. During an attempted unlocking operation, once the mechanical component of the smart key engages with the lock core, the smart key reads the unique identifier of the lock core and determines whether the smart key is allowed to open the lock based on the unique identifier and a security or safety policy received by the smart key. The policy specifies which locks are allowed to be open at the instant moment. If the smart key is allowed to open the lock, the electrical component of the smart key activates the unlocking command, which enables the rotation of the mechanical component, thus unlocking the lock. Otherwise, the mechanical component is prevented from rotation, and the unlocking operation fails.

Standardized, Interchangeable Lock Core

Figure 1A:
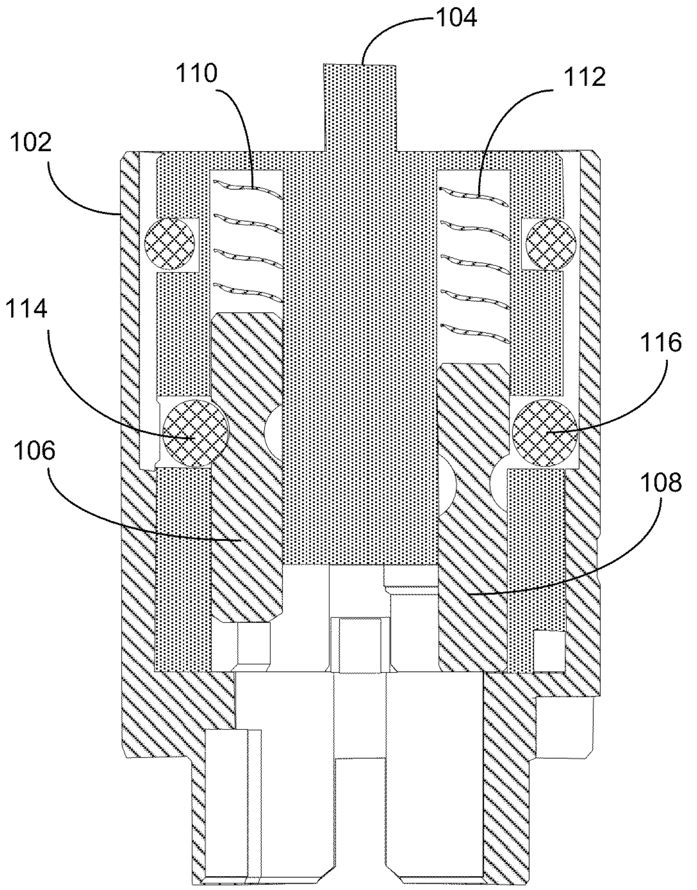
FIG. 1A presents a diagram illustrating a vertical cross-section of an exemplary interchangeable lock core, in accordance with an embodiment of the present invention.
Figure 1B:
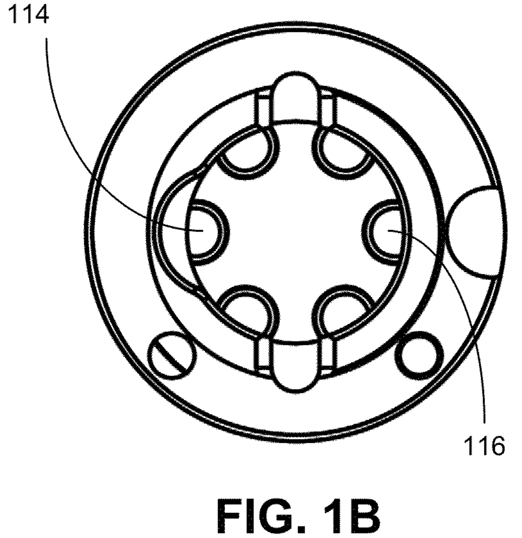
FIG. 1B presents a diagram illustrating a bottom view of the exemplary interchangeable lock core, in accordance with an embodiment of the present invention.

FIG. 1A presents a diagram illustrating a vertical cross-section of an exemplary interchangeable lock core, in accordance with an embodiment of the present invention. Lock core 100 includes an outer casing 102; a plug 104; a number of pins, such as pins 106 and 108; a number of springs, such as springs 110 and 112; and a number of bearing balls, such as bearing balls 114 and 116. FIG. 1B presents a diagram illustrating a bottom view of the exemplary interchangeable lock core, in accordance with an embodiment of the present invention.

Outer casing 102 encloses other components of lock core 100 and enables coupling between lock core 100 and the body of a lock, such as a padlock or a deadlatch lock. Plug 104 can be rotated by a key, and thus when combining with other components of the lock, such as the shackles of a padlock, enables the locking and unlocking of the lock. A number of bearing balls, such as bearing balls 114 and 116, are placed between outer casing 102 and plug 104. Because the bearing balls are slightly larger than corresponding holes on plug 104, under normal conditions when no key is inserted into lock core 100, any attempts to rotate plug 104 against outer casing 102 is stopped by these bearing balls pushed against outer casing 102. On the other hand, when a matching key is inserted into lock core 100, the pins (such as pins 106 and 108) are pushed against the springs (such as springs 110 and 112) to a location where holes on the pins are aligned with the holes on plug 104. Consequently, the bearing balls can shift into those holes on the pins when plug 104 is rotated against outer casing 102, thus no longer preventing the rotation of plug 104 against outer casing 102. Once the key is removed, springs 110 and 112 will force pins 106 and 108, respectively, to move back to their original positions.

Figure 1C:
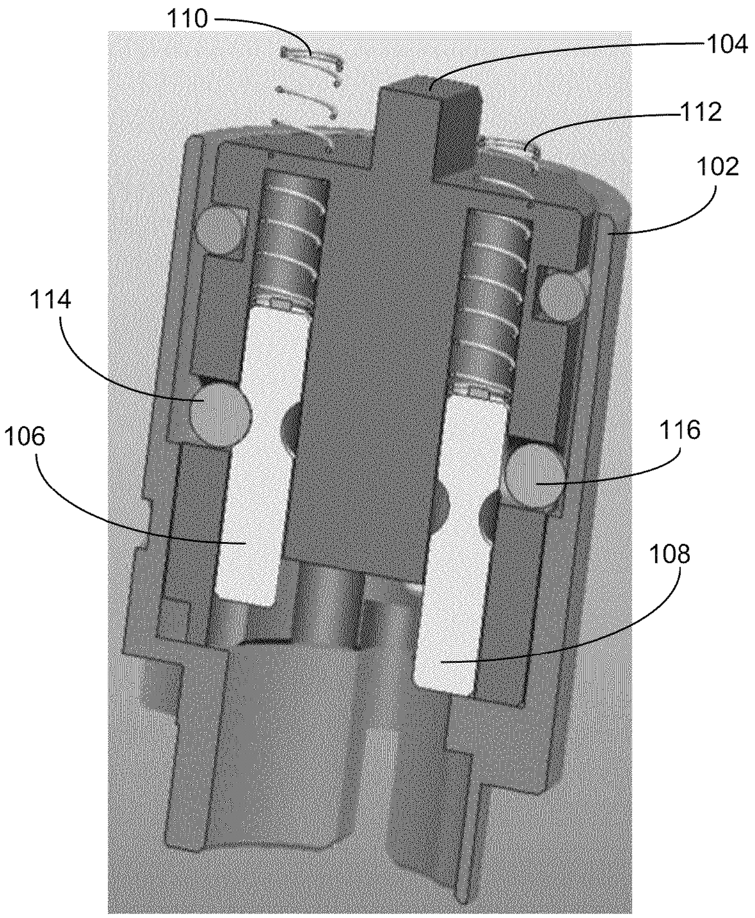
FIG. 1C presents a 3-D diagram illustrating the vertical cross-section of the exemplary interchangeable lock core, in accordance with an embodiment of the present invention.
Figure 1D:
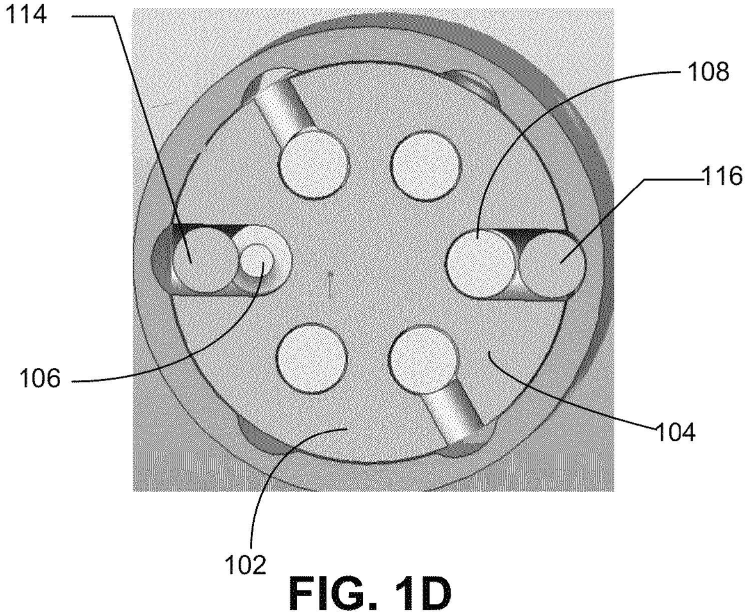
FIG. 1D presents a 3-D diagram illustrating the transversal cross-section of the exemplary interchangeable lock core, in accordance with an embodiment of the present invention.

FIG. 1C presents a 3-D diagram illustrating the vertical cross-section of the exemplary interchangeable lock core, in accordance with an embodiment of the present invention. In the diagram shown in FIGS. 1A and 1C, pin 106 has been pushed against spring 110 to allow bearing ball 114 to fall into a hole on pin 106. As a result, bearing ball 114 no longer interferes with the rotation of plug 104. On the other hand, pin 108 maintains its original position that prevents bearing ball 116 from shifting to the side. Hence, bearing ball 116 resists the rotation of plug 104. FIG. 1D presents a 3-D diagram illustrating the transversal cross-section of the exemplary interchangeable lock core, in accordance with an embodiment of the present invention. FIG. 1D shows more clearly the positions of bearing balls 114 and 116.

The standardized, interchangeable lock core shown in FIGS. 1A-1D can be installed in various types of locks. FIG. 2A presents a diagram illustrating the vertical cross-section of a padlock installed with the interchangeable lock core, in accordance with an embodiment of the present invention. FIG. 2B presents a 3-D diagram of the padlock. In one embodiment, all locks that use a physical key, including locks used on doors or knife switch handles, are installed with the same lock core, thus enabling the use of a single key. However, it is also important to make sure that this single key does not open all the locks indiscriminately. In other words, operations of this single key need to be monitored and controlled to prevent a key holder from performing unauthorized unlocking operations. To do so, each lock body is assigned a unique identifier (ID) that can be read electronically; and unlocking operations of the single key can be controlled and monitored based on the identifiers associated with the locks. In some embodiments, the unlocking function of the single key is enabled only when the unique identifier associated with the lock has been verified.

Figure 2C:
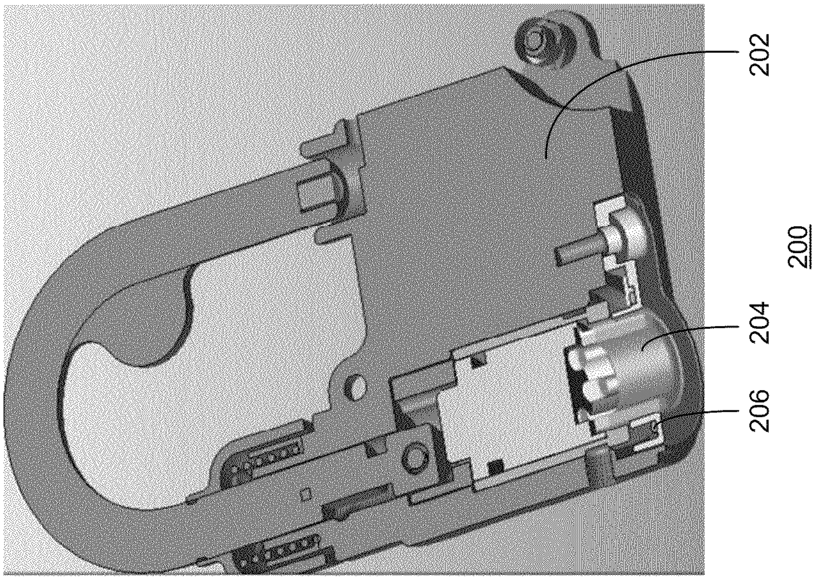
FIG. 2C presents a diagram illustrating a vertical cross-section of a lock, in accordance with an embodiment of the present invention.
Figure 2B:
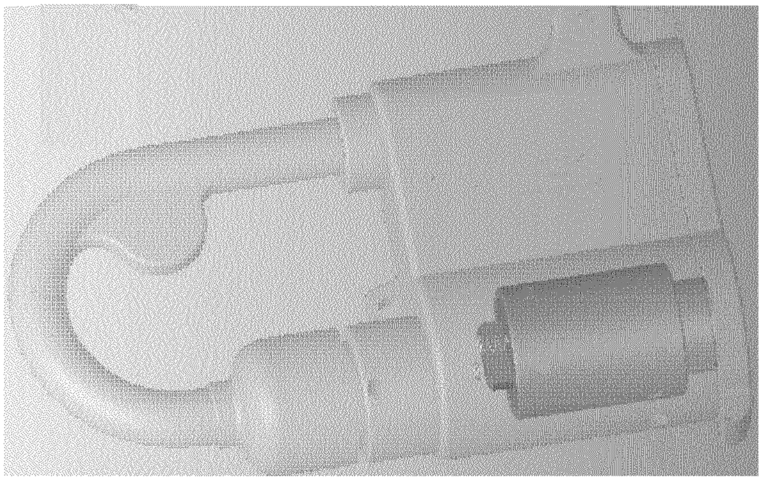
FIG. 2B presents a 3-D diagram of the padlock.
Figure 2A:
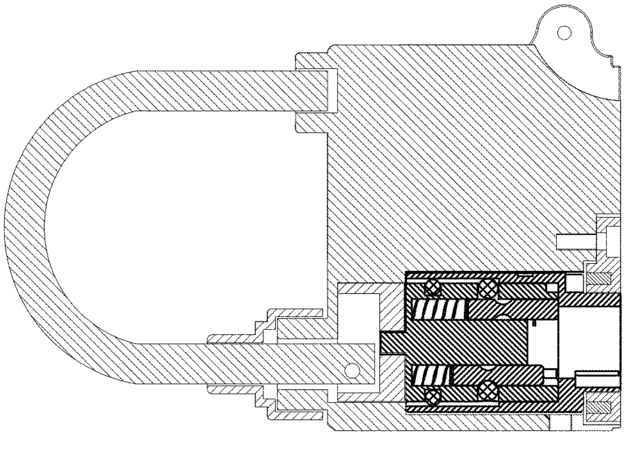
FIG. 2A presents a diagram illustrating the vertical cross-section of a padlock installed with the interchangeable lock core, in accordance with an embodiment of the present invention.

FIG. 2C presents a diagram illustrating a vertical cross-section of a lock, in accordance with an embodiment of the present invention. In FIG. 2C, lock 200 includes a lock body 202, a lock core 204, and a lock-ID chip 206. Various technologies can be used to implement the lock ID. In one embodiment, lock-ID chip 206 is a radio-frequency identification (RFID) tag. In a further embodiment, the RFID tag is passive. Each time the single key attempts to unlock a lock, the RFID tag of the lock needs to be read in order to determine whether the unlocking operation is authorized. The single key is enabled to unlock the lock only if the unlocking operation is an authorized operation. In some embodiments, the single key is a smart key that is capable of reading the RFID of a lock. The smart key is also equipped with a control module capable of enabling or disabling the unlocking function of the smart key based on the lock ID. Other technology can also be used to implement the lock ID. For example, the lock ID can be a barcode which can be read by a barcode reader installed on the single key.

Figure 2D:
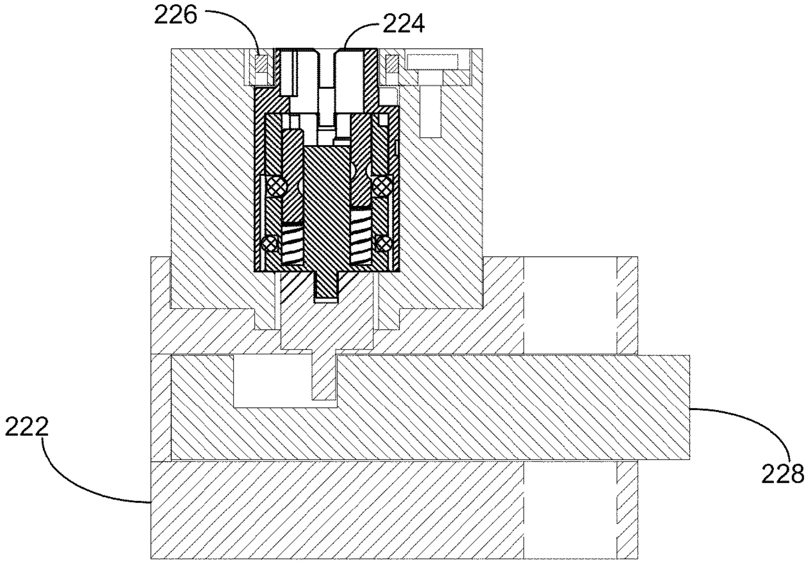
FIG. 2D presents a diagram illustrating the vertical cross-section of a latch lock installed with the interchangeable lock core, in accordance with an embodiment of the present invention.
Figure 2E:
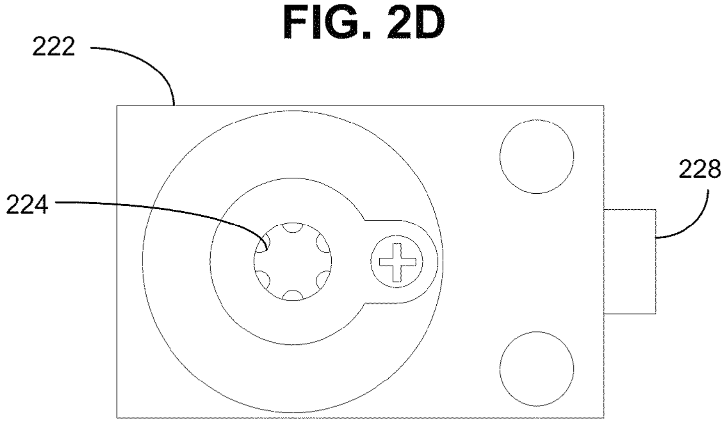
FIG. 2E presents a diagram illustrating the top view of the latch lock.
Figure 2F:
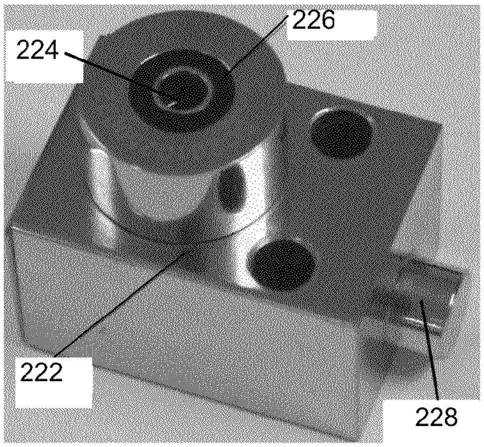
FIG. 2F presents a 3-D picture of the latch lock.

FIG. 2D presents a diagram illustrating the vertical cross-section of a latch lock installed with the interchangeable lock core, in accordance with an embodiment of the present invention. FIG. 2E presents a diagram illustrating the top view of the latch lock. FIG. 2F presents a 3-D picture of the latch lock. In FIGS. 2D-2F, the latch lock includes a lock body 222, a standardized lock core 224, a lock-ID chip 226, and a latch 228.

Smart Key

Figure 3B:
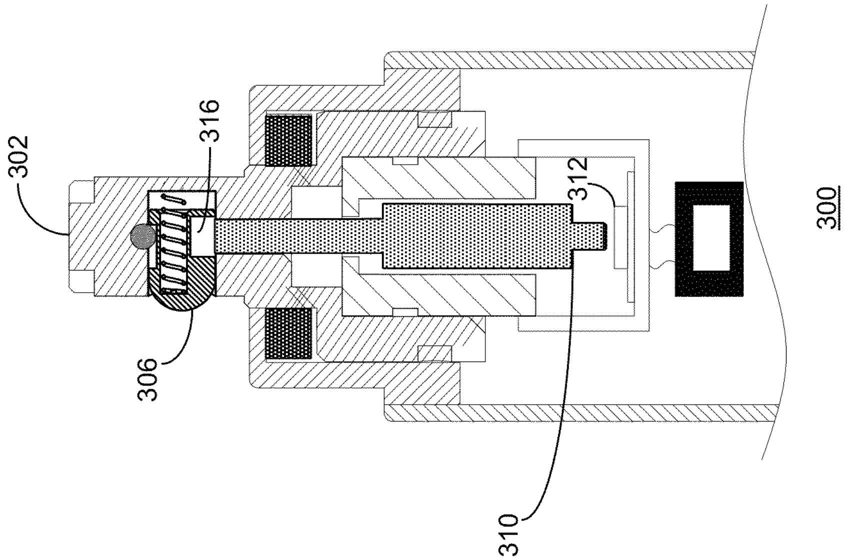
FIG. 3B presents another partial view of the vertical cross-section of the exemplary smart key.
Figure 3A:
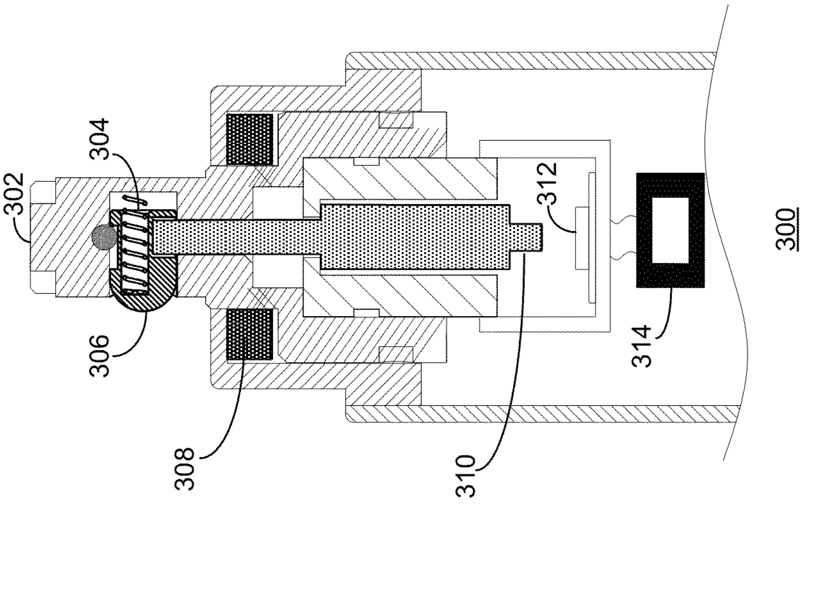
FIG. 3A presents a diagram illustrating a partial view of the vertical cross-section of an exemplary smart key, in accordance with an embodiment of the present invention.

FIG. 3A presents a diagram illustrating a partial view of the vertical cross-section of an exemplary smart key, in accordance with an embodiment of the present invention. Smart key 300 includes a number of mechanical components, such as a key head 302, a spring 304, and a sliding pin 306; and a number of electrical components, such as a lock-ID reader 308, a solenoid-controlled plug 310, a plug-position detector 312, and a micro-control unit (MCU) 314.

The shape of key head 302 matches the shape of the standardized, interchangeable lock core. In other words, when inserted into the lock core, key head 302 pushes all pins in the lock core into positions which allow the rotation of the plug inside the lock core. Hence, rotations of key head 302 can result in the rotations of the plug inside the lock core, which unlocks the lock. However, under normal conditions, rotations of smart key 300, and thus key head 302, are inhibited by sliding pin 306, which fits into a hole on the lock core and acts as a rotation stopper. The horizontal movement of sliding pin 306 is controlled by spring 304 and solenoid-controlled plug 310. In FIG. 3A, the end of plug 310 fits into an indentation on sliding pin 306, thus preventing the horizontal movement of sliding pin 306.

When a holder of smart key 300 insert key head 302 into the lock core of a lock, lock-ID reader 308 is brought to the vicinity of the lock-ID chip, thus being able to read the lock ID. The lock ID is then sent to MCU 314, which verifies whether the holder of smart key 300 is authorized to unlock the lock based on the detected lock ID. If it determines that the unlocking operation is authorized, MCU 314 issues an unlocking command that causes solenoid-controlled plug 310 to move downwardly toward plug-position detector 312. In one embodiment, the unlocking command causes electrical current to flow into a solenoid wrapped around plug 310, thus generating a magnetic force which moves plug 310. FIG. 3B presents another partial view of the vertical cross-section of the exemplary smart key, showing solenoid-controlled plug 310 retracted from its original position in FIG. 3A. Once plug-position detector 312 detects that plug 310 has moved into position, it will notify the key holder that smart key 300 can now be rotated. In one embodiment, smart key 300 includes a display configured to display such notification to the key holder. As shown in FIG. 3B, once the head of plug 310 retracts from an indentation 316 on sliding pin 306, plug 310 no long prevents sliding pin 306 from sliding horizontally, thus making the rotation of smart key 300 possible. FIG. 3B also When smart key 300 rotates, sliding pin 306 moves inside the body of key head 302 by pushing against spring 304, and enabling the continuous rotation of key head 302. Note that because corresponding pins in the lock core have been pushed into unlocking positions, the rotation of key head 302 will result in rotation of the plug in the lock core, which in turn unlocks the lock. In addition, once plug 310 is rotated back to its initial position, spring 304 will force sliding pin 306 to return to its original location.

Figure 4B:
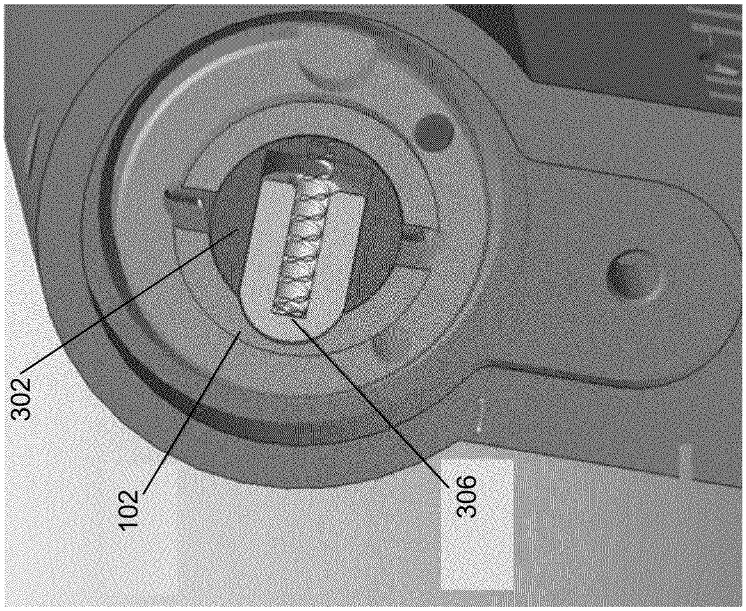
FIG. 4B presents a diagram illustrating the transversal cross-section of the smart key inserted into the lock.
Figure 4A:
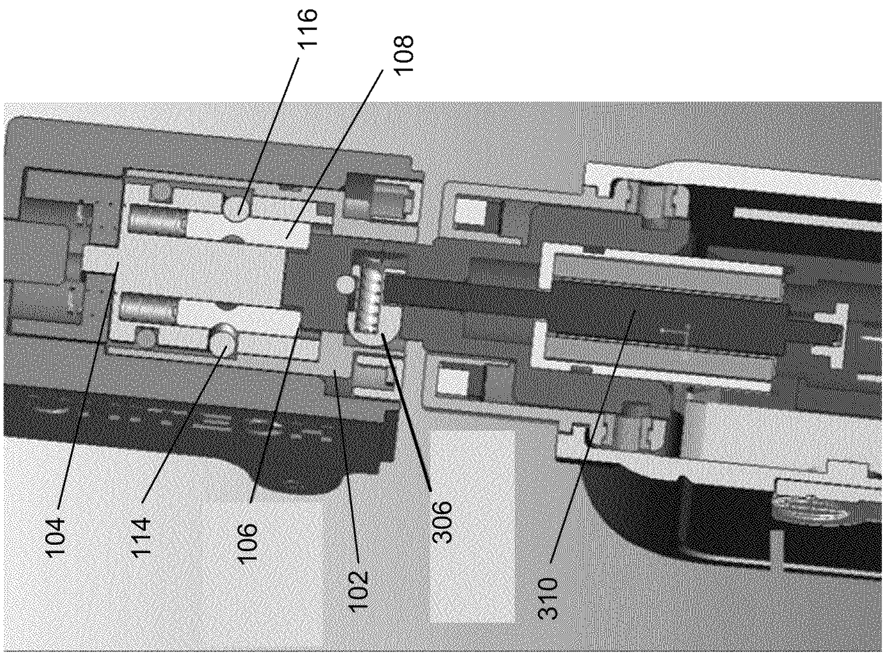
FIG. 4A presents a diagram illustrating a partial view of the vertical cross-section of the smart key inserted into a lock, in accordance with an embodiment of the present invention.

FIG. 4A presents a diagram illustrating a partial view of the vertical cross-section of the smart key inserted into a lock, in accordance with an embodiment of the present invention. In FIG. 4A, the key head of the smart key is inserted into the standardized, interchangeable lock core, pushing pins 106 and 108 into the unlocking locations which allow bearing balls 114 and 116 to shift into corresponding holes on pins 106 and 108. Consequently, plug 104 is ready for rotation. However, because solenoid-controlled plug 310 is inserted next to sliding pin 306 preventing the horizontal movement of sliding pin 306, any rotation of the smart key is prevented by sliding pin 306 pushing against outer casing 102 of the lock core. FIG. 4B presents a diagram illustrating the transversal cross-section of the smart key inserted into the lock. FIG. 4B shows more clearly how sliding pin 306 fits into a hole on outer casing 102 of the lock core, thus inhibiting rotation of the smart key. FIG. 4B also shows that, without plug 310 holding sliding pin 306, sliding pin 306 can slide horizontally to allow the rotation of key head 302.

Smart Key Management System

Figure 5:
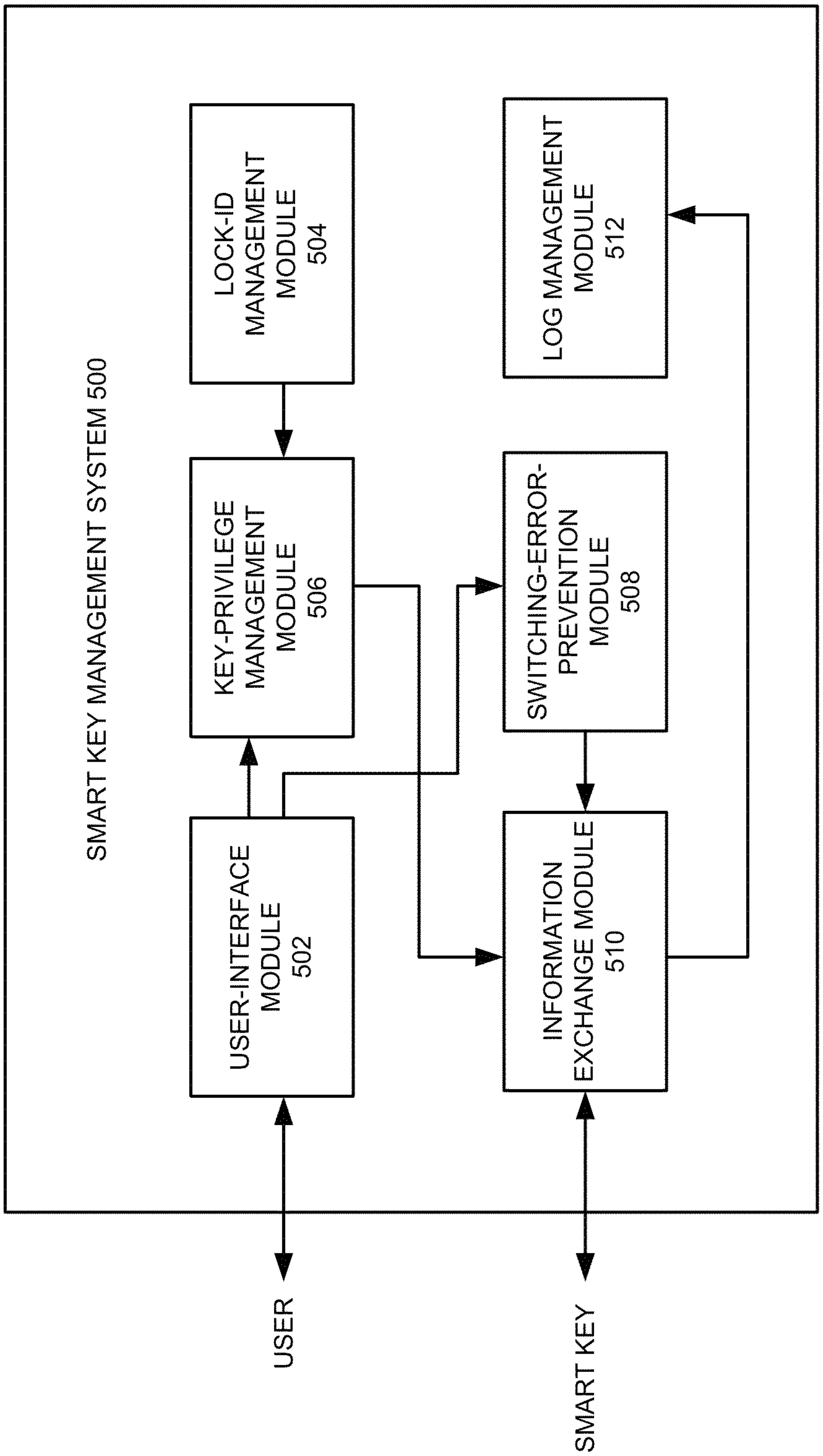
FIG. 5 presents a diagram illustrating the architecture of an exemplary smart key management system, in accordance with an embodiment of the present invention.

In order to manage the use of the smart key, embodiments of the present invention also include a computerized smart key management system. The computerized smart key management system can reside on any type of computer system based on microprocessors, such as a standalone mainframe computer, a cluster of computer servers, or a portable computing device. FIG. 5 presents a diagram illustrating the architecture of an exemplary smart key management system, in accordance with an embodiment of the present invention.

Smart key management system 500 includes a user-interface module 502, a lock-ID management module 504, a key-privilege management module 506, a switching-error-prevention module 508, an information exchange module 510, and a log management module 512.

User-interface module 502 provides an interface to the user of the smart key. Before a user is allowed to use the smart key to unlock any lock, the user is required to log into smart key management system 500. Lock-ID management module 504 maintains a record of all locks and their corresponding lock IDs within the substation. A system administrator is able to add or delete a lock record when corresponding changes happen in the field. Key-privilege management module 506 manages user privileges. Depending on the ranks and work responsibility of the users, each user is assigned certain key privileges that allow him to unlock a subset of locks.

Switching-error-prevention module 508 enforces the interlocking logic that prevents switching-sequence errors. Because operations of the switching devices involve unlocking corresponding locks, the switching order corresponds to the order of unlocking/locking a sequence of locks. In some embodiments, a switching-error-prevention simulation is run to make sure that the switching order, thus the order of unlocking/locking a sequence of locks, meets safety and regulation requirements. Details about the switching-error-prevention simulation can be found in U.S. patent application Ser. No. 13/473,437, entitled "Method and System for Preventing Misoperation in an Electric Power System ," by inventors Shuqiang Jin, Lingzhi Pang, Liguo Wan, Jiandong Huang, and Hongping Jiang, filed May 16, 2012, the disclosure of which is incorporated by reference in its entirety herein.

The key privilege and the switching order are sent to the smart key via information exchange module 510. In one embodiment, information exchange module 510 is a wireless transceiver capable of communicating with the smart key using various wireless communication protocols, such as ZigBee or CDMA. Depending on the key privilege and/or the switching order, the smart key proceeds to perform the unlocking operations. Each time the smart key performs an operation on a lock, it sends an operation record including the lock ID of the lock to log management module 512 via information exchange module 510. Log management module 512 maintains a log file that records operations of the smart key. Such log file allows a user of smart key management system 500 to keep track of all unlocking operations.

Figure 6:
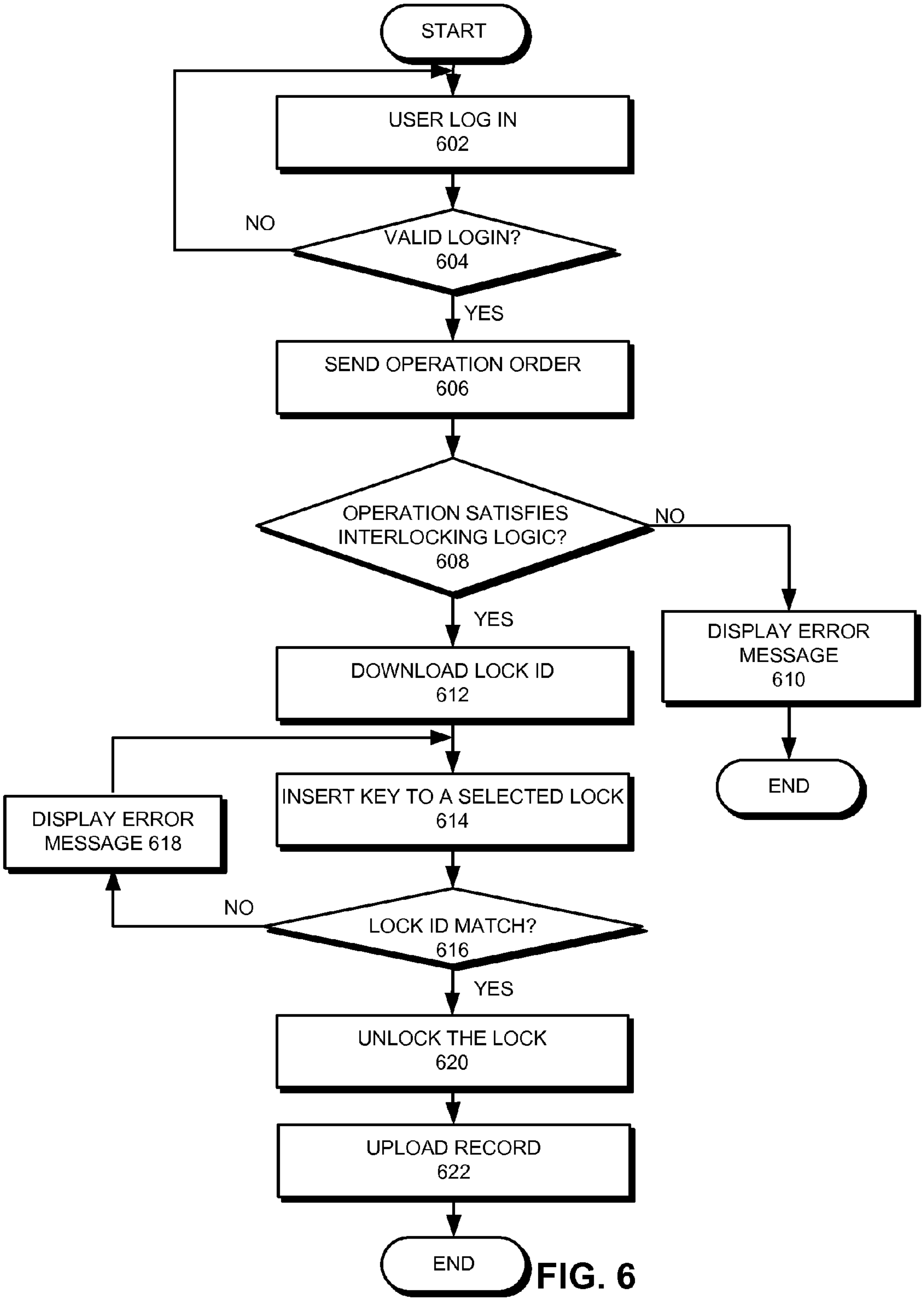
FIG. 6 presents a flow chart illustrating the process of an unlocking operation of a smart key, in accordance with an embodiment of the present invention.

FIG. 6 presents a flow chart illustrating the process of an unlocking operation of a smart key, in accordance with an embodiment of the present invention. During operation, a user logs in to the smart key management system (operation 602). The system determines whether the login is valid (operation 604). If so, the system sends an operation order to the smart key held by the user (operation 606). Note that the operation order specifies a switching operation on a switching device, thus a corresponding lock, to be operated on. Subsequently, the system determines whether the opening the lock satisfies the requirement of the interlocking logic (operation 608). Note that a switching-error-prevention simulation may be performed to determine whether opening the lock is allowed. If the lock (based on the lock ID) associated with the switching operation is not an authorized lock, or if opening the lock violates the interlocking logic, the system presents an error message (operation 610). Otherwise, the system transmits the lock ID to the smart key (operation 612). Once in the field, the user inserts the smart key into a selected lock (operation 614). The smart key determines whether the lock ID of the selected lock matches the previously downloaded lock ID (operation 616). If not, an error message is presented to the user indicating a wrong lock is selected (operation 618). Subsequently, the user will select a different lock and return to operation 614. If the lock ID of the selected lock matches the downloaded lock ID, the smart key unlocks the lock (operation 620), and uploads a record of operation to the smart key management system (operation 622).

Note that, depending whether a lock is used to control access or used for interlocking purposes, smart key management system manages the corresponding unlocking operations differently. In one embodiment, once a user logs in to the smart key management system, the system generates a list of locks that the user is authorized to open and downloads corresponding lock IDs to the smart key. Note that these locks are usually access locks, such as a lock to a storage cabinet. Because no interlocking is involved, the authorized user can open these locks at any time. Therefore, instead of sending the request each time the user attempts to open a lock, the smart key can check the lock ID against the downloaded lock-ID list to determine whether the user is authorized to open a current lock. On the other hand, before the user tries to unlock a lock involved in a switching operation, the smart key management system needs to send an order, which specifies one or more lock IDs associated with the switching operation, to the smart key. Subsequently, the smart key adds the lock IDs to the list of allowed locks if the operation is allowed, or displays an error message to the user if the operation is denied.

By implementing a standardized lock core and a smart key, embodiments of the present invention relieve the burden of managing a large number of physical keys, thus preventing key-related errors and enhancing operation efficiency. Because the smart key is controlled by the smart key management system, and is only allowed to perform authorized operations or operations that comply with safety and regulation requirements, the system eliminates the possibility of a key holder accidentally opening a wrong lock. In addition, a log is generated automatically for operations of the smart key, thus eliminating the need for the user to manually keep track of which lock has been opened. The automatically generated operation log also provides a way for an administrator or manager to monitor switching operations performed by staff members.

Note that the physical descriptions, such as shapes and dimensions of the lock core and the smart key shown in FIGS. 1A-4B, are for illustration purposes only, and should not limit the scope of this disclosure. For example, FIGS. 1A-4B illustrate the lock core as a tubular or radial lock and the key head of the smart key as a tubular key. Other types of lock cores and keys are also possible as long as all locks within the system are installed with the same lock core and the smart key has a matching key head to that lock core. In addition, the smart key is also equipped with an electronically controlled rotation stopper that prevents the key head from rotation unless the lock ID of the lock has been validated.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A lock-and-key system for an electrical power plant, comprising:

a plurality of locks, wherein a respective lock is installed with a standardized lock core, and wherein the lock is associated with a lock identifier (ID); and a smart key, wherein the smart key comprises:

a key head that matches the standardized lock core, a lock-ID detector configured to detect the lock ID, a movable rotation stopper located on the smart key, wherein when enabled, the movable rotation stopper is configured to slide into a void located on the standardized lock core to prevent rotation of the key head while the key head is inserted into the standardized lock core, and a control module located on the smart key configured to disable the movable rotation stopper based on the detected lock ID by sliding the rotation stopper out of the void, thereby facilitating the smart key to unlock the lock by rotating the key head.

2. The lock-and-key system of claim 1, further comprising a smart key management module configured to determine whether the smart key is allowed to unlock the lock based on a user of the smart key and/or the lock ID.

3. The lock-and-key system of claim 2, wherein the smart key further comprises a transceiver module configured to communicate with the smart key management module.

4. The lock-and-key system of claim 2, wherein the smart key management module is further configured to maintain an operation record of the smart key.

5. The lock-and-key system of claim 2, wherein while determining whether the smart key is allowed to unlock the lock, the smart key management module is further configured to perform a switching-error-prevention simulation.

6. The lock-and-key system of claim 1, wherein the lock further includes a radio-frequency identification (RFID) tag configured to store the lock ID, and wherein the lock-ID detector is an RFID reader.

7. The lock-and-key system of claim 1, wherein the standardized lock core is a tubular lock.

8. The lock-and-key system of claim 1, wherein the movable rotation stopper is a spring-loaded sliding pin.

9. The lock-and-key system of claim 8, wherein while disabling the movable rotation stopper, the control module is configured to retract a plug that blocks a horizontal movement of the spring-loaded sliding pin.

10. A computer-executable method for managing a lock-and-key system in an electrical power plant, wherein the method comprises:

receiving, from a user, a request to perform an unlocking operation on a lock installed with a standardized lock core;

determining whether the unlocking operation is allowed;

in response to the unlocking operation being allowed, sending a control message to a smart key, wherein the control message enables the smart key to perform the unlocking operation on the lock by disabling a movable rotation stopper located on the smart key while the smart key is inserted into the standardized lock core to enable rotation of the smart key, wherein disabling the movable rotation stopper involves sliding the movable rotation stopper out of a void located on the standardized lock core; and receiving a record of the unlocking operation from the smart key.

11. The method of claim 10, wherein the smart key includes a key head that matches the standardized lock core.

12. The method of claim 10, wherein determining whether the unlocking operation is allowed involves:

identifying the user; and/or performing a switching-error-prevention simulation.

13. The method of claim 10, wherein the control message includes an identifier associated with the lock.

14. The method of claim 13, wherein performing the unlocking operation involves:

detecting an identifier embedded in the lock;

comparing the detected identifier with the identifier included in the control message;

in response to the detected identifier matching the identifier included in the control message, disabling the movable rotation stopper located on the smart key by sliding the movable rotation stopper out of the void located on the standardized lock core to enable rotation of the smart key.

15. The method of claim 14, wherein detecting the identifier embedded in the lock involves reading a radio-frequency identification (RFID) tag embedded in the lock.

16. The method of claim 14, wherein the movable rotation stopper is a spring-loaded sliding pin.

17. The method of claim 16, wherein disabling the movable rotation stopper involves retracting a plug that blocks a horizontal movement of the spring-loaded sliding pin.

18. A non-transitory computer-readable storage medium storing instructions that when executed by a computer cause the computer to perform a method for managing a lock-and-key system in an electrical power plant, the method comprising:

receiving, from a user, a request to perform an unlocking operation on a lock installed with a standardized lock core;

determining whether the unlocking operation is allowed;

in response to the unlocking operation being allowed, sending a control message to a smart key, wherein the control message enables the smart key to perform the unlocking operation on the lock by disabling a movable rotation stopper located on the smart key while the smart key is inserted into the standardized lock core to enable rotation of the smart key, wherein disabling the movable rotation stopper involves sliding the movable rotation stopper out of a void located on the standardized lock core; and receiving a record of the unlocking operation from the smart key.

19. The computer-readable storage medium of claim 18, wherein the smart key includes a key head that matches the standardized lock core.

20. The computer-readable storage medium of claim 18, wherein determining whether the unlocking operation is allowed involves:

identifying the user; and/or performing a switching-error-prevention simulation.

21. The computer-readable storage medium of claim 18, wherein the control message includes an identifier associated with the lock.

22. The computer-readable storage medium of claim 21, wherein performing the unlocking operation involves:

detecting an identifier embedded in the lock; and comparing the detected identifier with the identifier included in the control message;

in response to the detected identifier matching the identifier included in the control message, disabling the movable rotation stopper located on the smart key by sliding the movable rotation stopper out of a void located on the standardized lock core to enable rotation of the smart key.

23. The computer-readable storage medium of claim 22, wherein detecting the identifier embedded in the lock involves reading a radio-frequency identification (RFID) tag embedded in the lock.

24. The computer-readable storage medium of claim 22, wherein the movable rotation stopper is a spring-loaded sliding pin.

25. The computer-readable storage medium of claim 24, wherein while disabling the movable rotation stopper, the control module is configured to retract a plug that blocks a horizontal movement of the spring-loaded sliding pin.

* * * * *